(12) United States Patent
Kim et al.

(10) Patent No.: US 8,988,645 B2
(45) Date of Patent: Mar. 24, 2015

(54) DISPLAY DEVICES

(75) Inventors: Jichul Kim, Yongin-si (KR);
Young-Deuk Kim, Suwon-si (KR);
Eunseok Cho, Suwon-si (KR); Mi-Na Choi, Seoul (KR)

(73) Assignee: Samsung Electronics Co., Ltd., Gyeonggi-Do (KR)

( * ) Notice: Subject to any disclaimer, the term of this patent is extended or adjusted under 35 U.S.C. 154(b) by 178 days.

(21) Appl. No.: 13/596,647

(22) Filed: Aug. 28, 2012

(65) Prior Publication Data

US 2013/0057559 A1    Mar. 7, 2013

(30) Foreign Application Priority Data

Sep. 1, 2011    (KR) .......................... 10-2011-0088581

(51) Int. Cl.
*G02F 1/1345*    (2006.01)
*G06F 13/00*    (2006.01)
*G02F 1/1333*    (2006.01)
*G06F 3/038*    (2013.01)
*G06F 13/14*    (2006.01)

(52) U.S. Cl.
CPC ...................................... *G06F 13/00* (2013.01)
USPC ............. 349/150; 349/58; 349/149; 349/151; 349/152; 349/161; 345/205; 345/519

(58) Field of Classification Search
CPC .............. G02F 1/13452; G02F 1/1345; G02F 1/133308; G02F 1/13458; G02F 2001/133314; G02F 1/133382; G02F 1/136277; G02F 2201/56; G02F 1/13454; G02F 1/133385; G02F 2201/36; G02F 2001/133628; G02F 1/3306; G02F 1/136; H05K 3/361; H05K 2201/10681; H05K 2201/10136; H05K 3/0061; H05K 3/305; H01L 2224/48227; H01L 2224/48247; H01L 2924/14; H01L 2224/05599; H01L 23/5389; H01L 23/49833; H01L 23/5387; H01L 2225/06582; H01L 23/34; H01L 23/49572; G09G 3/3233; G09G 2300/0426; G09G 2310/027; G09G 2300/0408; G09G 3/3685; G09G 3/3283; G09G 2310/0264; G09G 2310/0272; G09G 2310/0278; G09G 2310/0281
See application file for complete search history.

(56) References Cited

U.S. PATENT DOCUMENTS

| 6,534,722 | B2 * | 3/2003 | Takaoka ........................ 174/254 |
| 7,397,111 | B2 * | 7/2008 | Jerebic et al. ................. 257/659 |
| 2002/0174998 | A1 | 11/2002 | Takaoka |
| 2006/0131712 | A1 | 6/2006 | Jerebic et al. |
| 2009/0185096 | A1 * | 7/2009 | Park ............................... 349/56 |

FOREIGN PATENT DOCUMENTS

| JP | 08064928 A | 3/1996 |
| JP | 2002351346 A | 12/2002 |

* cited by examiner

*Primary Examiner* — Bumsuk Won
*Assistant Examiner* — Angela Davison
(74) *Attorney, Agent, or Firm* — Harness, Dickey & Pierce, P.L.C.

(57) ABSTRACT

A display device includes a panel including pixels defined by data lines and gate lines, a housing chassis covering a sidewall and an edge of the panel, a printed circuit board under the panel, the printed circuit board including circuit elements configured to generate at least one of a data signal, a gate signal, and a control signal, a chip on film connecting the printed circuit board to the panel, the chip on film between the housing chassis and the sidewall of the panel, a driver integrated circuit mounted on the chip on film and configured to respond to the control signal and drive at least one of the data signal and the gate signal applied to the data lines and the gate lines, and a connection unit attaching the chip on film to the housing chassis and dissipating heat generated by the driver integrated circuit to the housing chassis.

18 Claims, 3 Drawing Sheets

DISPLAY DEVICES

CROSS-REFERENCE TO RELATED APPLICATIONS

This U.S. non-provisional patent application claims priority under 35 U.S.C. §119 to Korean Patent Application No. 10-2011-0088581, filed on Sep. 1, 2011, the entirety of which is incorporated by reference herein.

BACKGROUND

The inventive concepts relate to display devices.

Generally, flat panel display devices may control a transmitted light and/or the intensity of the light according to an image control signal, thereby displaying an image. In particular, liquid crystal display devices have been used in various applications because of their desirable characteristics e.g. reduced glare, slim design, low-power consumption, etc. For example, liquid crystal display devices may be used in office automation devices, notebook computers, or mobile phones, etc.

The display device may include a liquid crystal panel displaying the image and, a data driver integrated circuit and a gate driver integrated circuit driving the liquid crystal panel. Unwanted heat may be generated during heavy operation of the data driver integrated circuit and the gate driver integrated circuit.

SUMMARY

Some example embodiments of the inventive concepts may provide display devices capable of effectively removing heat caused by a data driver integrated circuit and a gate driver integrated circuit.

Some example embodiments of the inventive concepts may also provide display devices capable of increasing (or alternatively, maximizing) productivity.

According to an example embodiment of the inventive concepts, a display device may include: a panel including pixels defined by data lines and gate lines; a housing chassis covering a sidewall and an edge of the panel; a printed circuit board under the panel, the printed circuit board configured to generate at least one of a data signal, a gate signal, and a control signal applied to the data lines and the gate lines; a chip on film connecting the printed circuit board to the panel, the chip on film passing between the housing chassis and the sidewall of the panel; a driver integrated circuit mounted on the chip on film, the driver integrated circuit configured to respond to the control signal received from the circuit elements and drive the data signal and the gate signal applied to the data lines and the gate lines; and a connection unit attaching the chip on film to the housing chassis and dissipating heat generated by the driver integrated circuit to the housing chassis.

In some embodiments, the connection unit may include a magnet.

In other embodiments, the magnet may include at least one of a bar magnet, a sheet magnet, and a powder magnet.

In still other embodiments, the magnet may affix the chip on film to the housing chassis.

In yet other embodiments, the magnet may be between the housing chassis and the chip on film.

In yet still other embodiments, the chip on film may be a tape carrier package.

In further embodiments, the display device may further include: a mold frame surrounding the sidewall of the panel in the housing chassis.

In still further embodiments, the display device may further include: a backlight unit in the mold frame and under the panel, the backlight configured to provide light to the panel; a light guide plate under the panel in the mold frame and configured to input the light from the backlight unit into the panel; optical sheets between the light guide plate and the panel; and a reflection plate under the light guide plate opposite to the optical sheets.

In even further embodiments, the display device may further include: a bottom chassis between the printed circuit board and the reflection plate. The bottom chassis may support the mold frame and the reflection plate and be combined with the housing chassis.

According to at least one example embodiment, a display device comprises: a mold frame; a housing chassis enclosing a sidewall and an edge of the mold frame; a flexible substrate passing between the housing chassis and the sidewall of the mold frame; an integrated circuit on the flexible substrate, the integrated circuit configured to drive the display device; and a connection unit attaching the flexible substrate to the housing chassis and dissipating heat generated by the integrated circuit to the housing chassis.

According to an example embodiment, the connection unit includes at least one magnet.

According to an example embodiment, the at least one magnet affixes the flexible substrate to the housing chassis using magnetic force.

According to an example embodiment, the at least one magnet is between the housing chassis and the flexible substrate.

According to an example embodiment, the at least one magnet is adhered to the flexible substrate.

According to an example embodiment, the mold frame includes a groove, and the integrated circuit is aligned with the groove.

According to an example embodiment, the flexible substrate is a chip on film.

According to an example embodiment, the chip on film is a tape carrier package.

According to an example embodiment, the display device further comprises: a display panel in the mold frame; a backlight unit in the mold frame, the backlight unit configured to provide light to the display panel; a light guide plate below the display panel, the light guide configured to input light from the backlight unit to the display panel; an optical sheet between the light guide plate and the panel; a reflection plate in the mold frame below the light guide plate; a bottom chassis below the reflection plate, the bottom chassis supporting the mold frame and combining with the housing chassis to form the display device; and a printed circuit board below the bottom chassis, the printed circuit board including circuit elements configured to send a control signal to the integrated circuit.

BRIEF DESCRIPTION OF THE DRAWINGS

Example embodiments of the inventive concepts will become more apparent in view of the detailed description and the attached drawings, in which.

DETAILED DESCRIPTION OF EXAMPLE EMBODIMENTS

Figure 1:
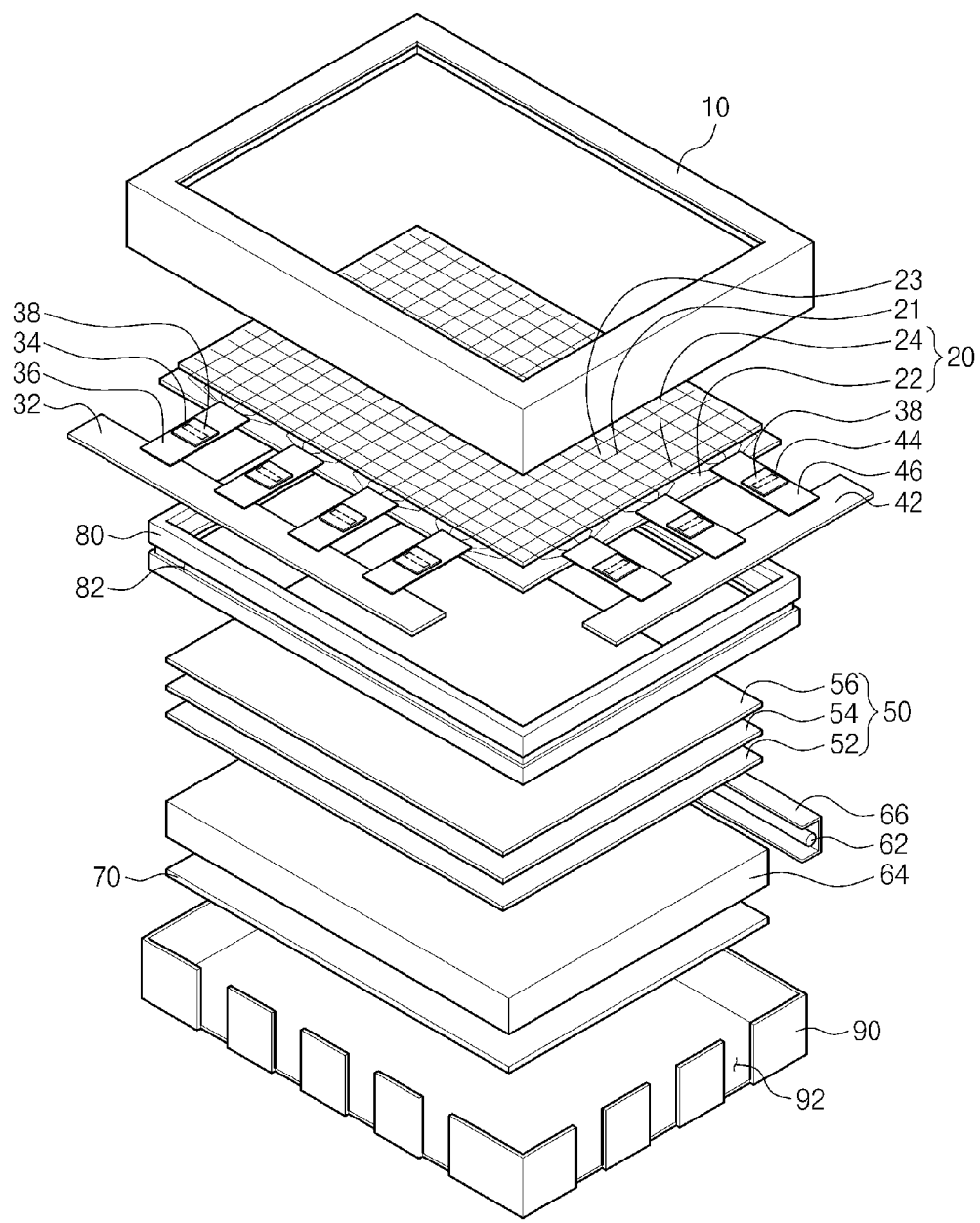
FIG. 1 is an exploded perspective view illustrating a display device according to an example embodiment of the inventive concepts.

The inventive concepts will now be described more fully hereinafter with reference to the accompanying drawings, in which example embodiments of the inventive concepts are shown. The advantages and features of the inventive concepts and methods of achieving them will be apparent from the following example embodiments that will be described in more detail with reference to the accompanying drawings. It should be noted, however, that the inventive concepts are not limited to the following example embodiments, and may be implemented in various forms. Accordingly, example embodiments are provided only to disclose the inventive concepts and let those skilled in the art know the category of the inventive concepts. In the drawings, example embodiments of the inventive concepts are not limited to the specific examples provided herein and are exaggerated for clarity.

The terminology used herein is for the purpose of describing particular embodiments only and is not intended to be limiting. As used herein, the singular terms "a," "an" and "the" are intended to include the plural forms as well, unless the context clearly indicates otherwise. As used herein, the term "and/or" includes any and all combinations of one or more of the associated listed items. It will be understood that when an element is referred to as being "connected" or "coupled" to another element, it may be directly connected or coupled to the other element or intervening elements may be present.

Similarly, it will be understood that when an element such as a layer, region or substrate is referred to as being "on" another element, it can be directly on the other element or intervening elements may be present. In contrast, the term "directly" means that there are no intervening elements. It will be further understood that the terms "comprises", "comprising,", "includes" and/or "including", when used herein, specify the presence of stated features, integers, steps, operations, elements, and/or components, but do not preclude the presence or addition of one or more other features, integers, steps, operations, elements, components, and/or groups thereof.

Additionally, example embodiments in the detailed description will be described with sectional views as ideal example views of the inventive concepts. Accordingly, shapes of the example views may be modified according to manufacturing techniques and/or allowable errors. Therefore, example embodiments of the inventive concepts are not limited to the specific shape illustrated in the example views, but may include other shapes that may be created according to manufacturing processes. Areas exemplified in the drawings have general properties, and are used to illustrate specific shapes of elements. Thus, this should not be construed as limited to the scope of the inventive concepts.

It will be also understood that although the terms first, second, third etc. may be used herein to describe various elements, these elements should not be limited by these terms. These terms are only used to distinguish one element from another element. Thus, a first element in some embodiments could be termed a second element in other embodiments without departing from the teachings of the example embodiments. Example embodiments of aspects of the inventive concepts explained and illustrated herein include their complementary counterparts. The same reference numerals or the same reference designators denote the same elements throughout the specification.

Spatially relative terms, such as "below", "beneath", "lower", "above", "upper", and the like, may be used herein for ease of description to describe the relationship of one element or feature to another element(s) or feature(s) as illustrated in the figures. It will be understood that the spatially relative terms are intended to encompass different orientations of the device in use or operation, in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

It will be understood that when an element is referred to as being "connected to" or "coupled to" another element, it can be directly on, connected or coupled to the other element or intervening elements may be present. In contrast, when an element is referred to as being "directly connected to" or "directly coupled to" another element, there are no intervening elements present. Like numbers refer to like elements throughout. As used herein, the term "and/or" includes any and all combinations of one or more of the associated listed items.

Moreover, example embodiments are described herein with reference to cross-sectional illustrations and/or plane illustrations that are idealized example illustrations. Accordingly, variations from the shapes of the illustrations as a result, for example, of manufacturing techniques and/or tolerances, are to be expected. Thus, example embodiments should not be construed as limited to the shapes of regions illustrated herein but are to include deviations in shapes that result, for example, from manufacturing. For example, an etching region illustrated as a rectangle will, typically, have rounded or curved features. Thus, the regions illustrated in the figures are schematic in nature and their shapes are not intended to illustrate the actual shape of a region of a device and are not intended to limit the scope of example embodiments.

Figure 2:
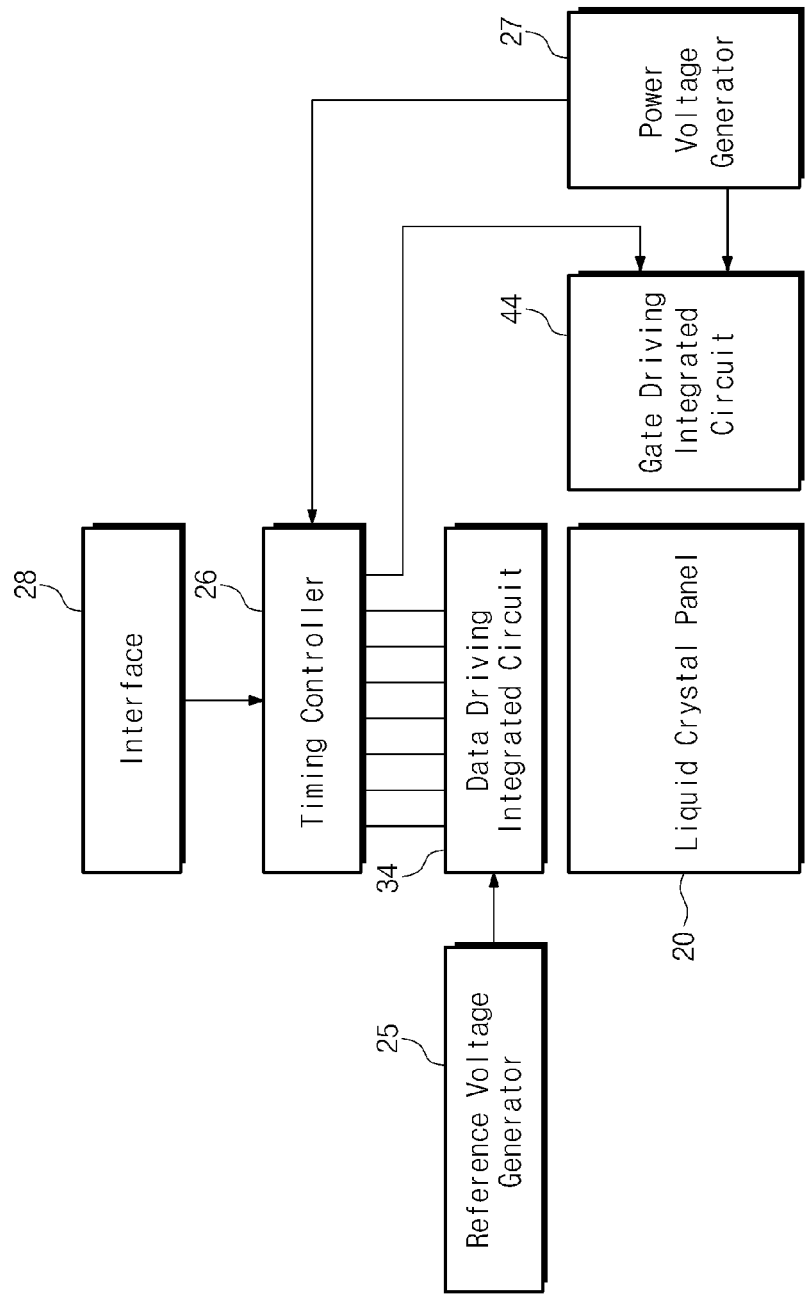
FIG. 2 is a schematic block diagram according to an example embodiment illustrating a relation between a liquid crystal panel and printed circuit boards of FIG. 1.
Figure 3:
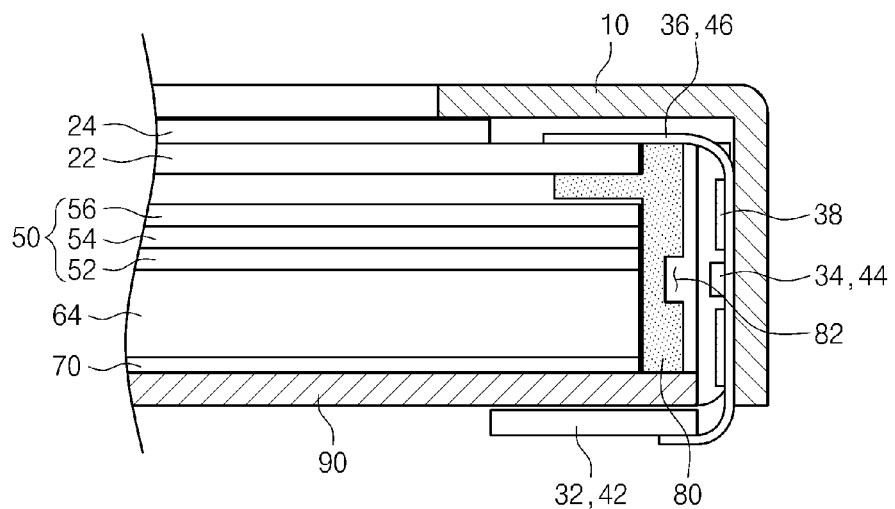
FIGS. 3 and 4 are cross sectional views according to an example embodiment illustrating driver integrated circuits and magnets of FIG. 1.
Figure 4:
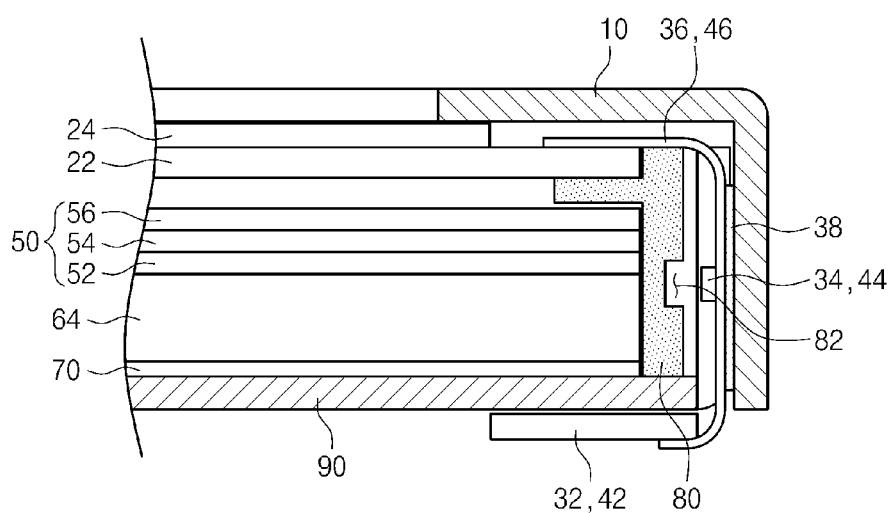

FIG. 1 is a perspective view illustrating a display device according to an example embodiment of the inventive concepts. FIG. 2 is a schematic block diagram illustrating a relation between a liquid crystal panel and printed circuit boards of FIG. 1. FIGS. 3 and 4 are cross sectional views illustrating driver integrated circuits and magnets of FIG. 1.

Referring to FIGS. 1 and 2, a display device according to at least one example embodiment of the inventive concepts may include magnets 38 affixing data chip on films 36 and gate chip on films 46 to a housing chassis 10. The data chip on films 36 and gate chip on films 46 may be adhered to the housing chassis 10, which may be affixed to the magnets 38. Data driver integrated circuits 34 may be mounted on the data chip on films 36. Gate driver integrated circuits 44 may be mounted on the gate chip on films 46. The data driver integrated circuits 34 and the gate driver integrated circuits 44 may generate heat during operation of the display device when receiving a data signal, a gate signal, and/or a control signal. The data chip on films 36 and the gate chip on films 46 may dissipate the heat generated by the data driver integrated circuits 34 and the gate driver integrated circuits 44 to the housing chassis 10, and the housing chassis 10 may dissipate the heat to the outside environment. Thus, the housing chassis 10 may reduce (or alternatively, prevent) overheating of the data driver integrated circuits 34 and the gate driver integrated circuits 44.

Accordingly, productivity of the display device may be increased (or alternatively, maximized) because the display device according to at least one example embodiment of the inventive concepts may increase the life of the data driver integrated circuits 34 and the gate driver integrated circuits 44.

Still referring to FIG. 1, a backlight unit 62 may provide light to a liquid crystal panel 20. The backlight unit 62 may include a cold cathode fluorescent lamp (CCFL) or a light emitting diode (LED). The backlight unit 62 may be an edge type or a direct type backlight. For example, FIG. 1 illustrates a CCFL edge type backlight unit 62. A reflection shade 66 may reflect the light generated from the backlight unit 62 into a light guide plate 64. The light guide plate 64 may input the light provided from the backlight unit 62 to the liquid crystal panel 20. The light guide plate 64 may transmit the light from an edge of the liquid crystal panel 20 to another edge of the liquid crystal panel 20. The light guide plate 64 may be formed of a transparent material having a high transmittance. A reflection plate 70 may be disposed under the light guide plate 64. Optical sheets 50 may be disposed on the light guide plate 64.

The optical sheets 50 may scatter and diffuse the light entering the liquid crystal panel 20 from the light guide plate 64. The optical sheets 50 may include a diffusion sheet 52, a prism sheet 54, and a protection sheet 56. The diffusion sheet 52 may diffuse the light outputted from the light guide plate 64. The prism sheet 54 may input the light transmitted from the diffusion sheet 52 to the liquid crystal panel 20. The protection sheet 56 may protect the prism sheet 54. The reflection plate 70 may reflect light in a direction from the light guide plate 64 toward the optical sheets 50.

Referring to FIGS. 1, 3, and 4, a mold frame 80 may fix the reflection plate 70, the light guide plate 64, the optical sheets 50, and a sidewall or an edge of the liquid crystal panel 20 in the housing chassis 10. The mold frame 80 may separate the liquid crystal panel 20 and the optical sheets 50 from each other. The backlight unit 62 and the reflection shade 66 may be inserted into the mold frame 80. The data chip on films 36 and the gate chip on films 46 may extend from an edge of the liquid crystal panel 20 beyond the outside edge of the mold frame 80. The data chip on films 36 and the gate chip on films 46 may pass between the mold frame 80 and the housing chassis 10 and fold under to a back side of the bottom chassis 90. The data driver integrated circuits 34 and the gate integrated circuits 44 may be mounted on the data chip on films 36 and the gate chip on films 46, respectively. The mold frame 80 may have a first groove 82 that aligns with the data driver integrated circuits 34 being mounted on the data chip on films 36. Additionally, the first groove 82 may also align with the gate driver integrated circuits 44 mounted on the gate chip on films 46.

A bottom chassis 90 may support the mold frame 80. The bottom chassis 90 may fix the reflection plate 70, the light guide plate 64, and the optical sheets 50 in the mold frame 80. The bottom chassis 90 may have second grooves 92. The data chip on films 36 and the gate chip on films 46 between the mold frame 80 and the housing chassis 10 may pass through the second grooves 92 and extend to a back side of the bottom chassis 90. In other words, the data chip on films 36 and the gate chip on films 46 may extend from the inside to beyond the outside edge of the mold frame 80 and to a back side of the bottom chassis 90 through the second grooves 92. The data chip on films 36 and the gate chip on films 46 may be connected to a front side of a thin film transistor substrate 22 disposed in the mold frame 80. Additionally, the data chip on films 36 and the gate chip on films 46 may be connected to a data printed circuit board 32 and a gate printed circuit board 42, respectively. The data printed circuit board 32 and the gate printed circuit board 42 may be disposed on a back side of the bottom chassis 90.

The liquid crystal panel 20 may control the light provided from the backlight unit 62 according to an arranged direction of a liquid crystals (not shown). The liquid crystal panel 20 may include the thin film transistor substrate 22 and a color filter substrate 24. The thin film transistor substrate 22 may include a pixel electrode. The pixel electrode may induce an electric field and control the arranged direction of the liquid crystals. The color filter substrate 24 may provide color to the light transmitted from the liquid crystals. Although not shown, the liquid crystals may be disposed between the thin film transistor substrate 22 and the color filter substrate 24. A lower polarization plate (not shown) may be disposed under the thin film transistor substrate 22, and an upper polarization plate (not shown) may be disposed on the color filter substrate 24.

The thin film transistor substrate 22 may include data lines 21 and gate lines 23 defining pixels. The pixels may be defined at crossing points of the data lines 21 and the gate lines 23. One thin film transistor may be disposed on each of the pixels. The data line 21 may transmit a data signal output from the data driver integrated circuit 34 to the thin film transistor through the data chip on film 36. Referring to FIG. 2, a reference voltage generator 25, a timing controller 26, and an interface 28 may be mounted on the data printed circuit board 32. The timing controller 26 may generate a data signal and a gate signal applied to the data lines 21 and the gate lines 23. The timing controller 26 may also generate a control signal latching the data signal and the gate signal. The data printed circuit board 32 may be connected to an end of the data chip on film 36 opposite to the liquid crystal panel 20. The data printed circuit board 32 may be disposed on the back side of the bottom chassis 90.

Referring back to FIGS. 1, 3, and 4, the data chip on films 36 may connect the thin film transistor substrate 22 of the liquid crystal panel 20 to the data printed circuit substrate 32. The data chip on films 36 may include metal wires (not shown) of the same number as the data lines 21 of the thin film transistor substrate 22 and a protection film insulating the metal wires. The data chip on films 36 may bend around the exterior of the mold frame 80. The data chip on films 36 may be connected from the liquid crystal panel 20 in the mold frame 80 to the data printed circuit substrate 32 under the mold frame 80. The data chip on films 36 may be tape carrier packages (TCP) having flexibility. Although not shown, the data chip on films 36 may include a plurality of metal lines connected to the data lines 21 and sheaths of the metal lines.

The data driver integrated circuits 34 may be mounted on the data chip on films 36. The data driver integrated circuits 34 may be mounted on the data chip on films 36 at wafer level without a protective polymer packaging. The data driver integrated circuits 34 may drive the data signal output from the timing controller 26. For example, the data driver integrated circuits 34 may temporarily store the data signal and output the data signal to the data lines 21 in response to the control signal.

The data driver integrated circuits 34 may include a plurality of resistor strings (not shown) storing the data signal. The data driver integrated circuits 34 may output the data signal stored in the resistor strings to the data lines 21 in response to the control signal of the timing controller 26. The resistor strings may be self-heated by a voltage drop corresponding to the data signal. For example, the data driver integrated circuits 34 may heat to a temperature of about 130 degrees Celsius to about 150 degrees Celsius. The data driver integrated circuits 34 may be provided with a power of about 1.6 watts (W) from the reference voltage generator 25 and the timing controller 26. The resistor string may be formed of a semiconductor material. Thus, when the resistor strings are heated, resistance of the resistor strings may be reduced and cause failure of the data driver integrated circuits 34. According to example embodiments, heat from the data driver integrated circuits 34 may dissipate to the data chip on film 36. According to some example embodiments, the data chip on film 36 may be adhered to the chassis 10 through magnet 38. According to other example embodiments, the data chip on film 36 may be adhered to the magnet 38 and separated from the housing chassis 10 by the magnet 38.

Referring to FIGS. 1, 3, and 4, the housing chassis 10 may include a frame or a case surrounding edges of the liquid crystal panel 20 and the mold frame 80. The housing chassis 10 may cover the edge of the liquid crystal panel 20 inserted in the mold frame 80. The data chip on films 36 and the backlight unit 62 may be arranged on opposite sides of the inner walls of the mold frame 80. The housing chassis 10 may include a metal such as iron. The housing chassis 10 may dissipate (or alternatively, remove) the heat generated by the data driver integrated circuit 34 and transmitted through the data chip on film 36 and the magnet 38.

The magnets 38 may be connection units adhering and affixing the data chip on films 36 to the housing chassis 10. For example, the magnets 38 may include a bar magnet, a sheet magnet, or a powder magnet, etc. Also, the magnets 38 may include rare earth metals such as neodymium (Nd), samarium (Sm), or cobalt (Co), etc.

Referring to FIGS. 1 and 3, the magnets 38 may adhere and affix the data chip on films 36 to the housing chassis 10 using magnetic force. In FIG. 3, a magnetic force may be created between the magnets 38 and the housing chassis 10, and the data chip on films 36 may be disposed between the magnets 38. Thus, the magnets 38 may adhere the data chip on films 36 to the housing chassis 10 via the magnetic force, i.e. the magnets 38 may be disposed on a bottom side of the films 36, which is the same side that includes the data driver integrated circuits 34. The heat generated by the data driver integrated circuits 34 may be transferred to the housing chassis 10 through the data chip on film 36 and the housing chassis 10 may dissipate the heat to the outside environment. For example, the data chip on films 36 may be cooled to a temperature of about 50 degrees Celsius to about 70 degrees Celsius.

As a result, the display device according to example embodiments of the inventive concepts may reduce (or alternatively, prevent) overheating of the data driver integrated circuits 34.

Referring to FIGS. 1 and 4, the magnets 38 may be disposed between the data chip on films 36 and the housing chassis 10, i.e. the magnets 38 may be disposed on a top side of films 36, which is opposite the side having the data driver integrated circuits 34. That is, the data chip on films 36 may be disposed between the data driver integrated circuits 34 and the magnets 38. In FIG. 4, the magnets 38 may be adhered to the data chip on films 36 by an adhesive or a high polymer adhesive film. The magnets 38 may also be placed in sheaths of the data chip on films 36. Since the magnets 38 include rare earth metal or iron, thermal conductivity of the magnets 38 may be excellent. The heat generated by the data driver integrated circuits 34 may be transferred to the housing chassis 10 through the data chip on films 36 and the magnets 38. Thus, the data chip on films 36 and the housing chassis 10 may dissipate heat generated by the data driver integrated circuits 34 to the outside environment.

Thus, the display device according to example embodiments of the inventive concepts may reduce (or alternatively, prevent) overheating of the data driver integrated circuits 34.

Referring to FIGS. 1 through 4, the gate lines 23 may transmit the gate signal outputted from the gate driver integrated circuits 44 to the thin film transistor through the gate chip on films 46. The gate printed circuit board 42 may include a power voltage generator 27. The gate driver integrated circuits 44 may be mounted on the gate chip on films 46. Application of the gate signal may heat the gate driver integrated circuits 44. In some example embodiments, the magnets 38 may affix the gate chip on films 46 to the housing chassis 10 via a magnetic force. The gate chip on films 46 and the housing chassis 10 may dissipate heat generated by the gate driver integrated circuits 44. The housing chassis 10 may remove most of the heat generated from the gate driver integrated circuits 44. In other example embodiments, the magnets 38 may be disposed between the gate chip on films 46 and the housing chassis 10, and the magnets 38 may be adhered to the gate chip on films 46 via a high polymer adhesive. Thus, the magnets 38 may further assist the gate chip on films 46 and housing chassis 10 with dissipating heat generated by gate driver integrated circuits 44.

As a result, the display device according to example embodiments of the inventive concepts may increase the life of the data driver integrated circuits 34 and the gate driver integrated circuits 44. Thus, productivity of the display device may be increased (or alternatively, maximized).

As described above, according to example embodiments of the inventive concepts, the chip on films may connect the panel to the printed circuit board. The printed circuit board may be disposed under the panel and the mold frame surrounding the panel. Driver integrated circuits may be mounted on the chip on films. The chip on films may pass between the housing chassis covering the edge of the panel and the mold frame. The chip on films may be affixed to the housing chassis by the magnets. The housing chassis may effectively remove the heat caused by the driver integrated circuits through the chip on films.

Accordingly, since the display device according to example embodiments of the inventive concepts may increase the lifetime of the driver integrated circuits, productivity of the display device may be increased (or alternatively, maximized).

While the inventive concepts have been described with reference to example embodiments, it will be apparent to those skilled in the art that various changes and modifications may be made without departing from the spirit and scope of the inventive concepts. For example, the inventive concepts are not limited to chip on films and may include any flexible substrate suitable for use in display devices. Likewise, the inventive concepts are not limited to display driver integrated circuits and may include other circuit elements associated with display devices. Therefore, it should be understood that the above example embodiments are not limiting, but illustrative. Thus, the scope of the inventive concepts is to be determined by the broadest permissible interpretation of the following claims and their equivalents, and shall not be restricted or limited by the foregoing description.

What is claimed is:

1. A display device comprising:
   a panel including pixels defined by data lines and gate lines;
   a housing chassis covering a sidewall and an edge of the panel;
   a printed circuit board under the panel, the printed circuit board including circuit elements configured to generate at least one of a data signal, a gate signal, and a control signal applied to at least one of the data lines and the gate lines;
   a chip on film connecting the printed circuit board to the panel, the chip on film being between the housing chassis and the sidewall of the panel;
   a driver integrated circuit mounted on the chip on film, the driver integrated circuit being configured to respond to the control signal received from the circuit elements and drive the data signal and the gate signal applied to the data lines and the gate lines; and
   a connection unit attaching the chip on film to the housing chassis and dissipating heat generated by the driver integrated circuit to the housing chassis., wherein the connection unit includes at least one magnet located between the chip on film and the panel.

2. The display device of claim 1, wherein the at least one magnet includes at least one of a bar magnet, a sheet magnet, and a powder magnet.

3. The display device of claim 1, wherein the at least one magnet affixes the chip on film to the housing chassis.

4. The display device of claim 1, wherein the at least one magnet is adhered to the chip on film.

5. The display device of claim 4, wherein the at least one magnet includes at least one of rare earth metals including neodymium (Nd), samarium (Sm), and cobalt (Co).

6. The display device of claim 1, wherein the chip on film is a tape carrier package.

7. The display device of claim 1, further comprising:
   a mold frame surrounding the sidewall of the panel in the housing chassis.

8. The display device of claim 7, further comprising:
   a backlight unit in the mold frame under the panel and configured to provide light to the panel;
   a light guide plate below the panel in the mold frame and configured to input light provided from the backlight unit to the panel;
   optical sheets between the light guide plate and the panel; and
   a reflection plate below the light guide plate.

9. The display device of claim 8, further comprising:
   a bottom chassis between the printed circuit board and the reflection plate, the bottom chassis supporting the mold frame and the reflection plate and being combined with the housing chassis.

10. The display device of claim 1, wherein the at least one magnet includes two magnets located on opposite sides of the driver integrated circuit.

11. A display device, comprising:
    a mold frame;
    a housing chassis enclosing a sidewall and an edge of the mold frame;
    a flexible substrate passing between the housing chassis and the sidewall of the mold frame;
    an integrated circuit on the flexible substrate, the integrated circuit being configured to drive the display device; and
    a connection unit attaching the flexible substrate to the housing chassis and dissipating heat generated by the integrated circuit to the housing chassis, wherein the connection unit includes at least one magnet located between the flexible substrate and the mold frame.

12. The device of claim 11, wherein the at least one magnet affixes the flexible substrate to the housing chassis using magnetic force.

13. The device of claim 11, wherein the at least one magnet is adhered to the flexible substrate.

14. The device of claim 11, wherein the mold frame includes a groove, and the integrated circuit is aligned with the groove.

15. The device of claim 11, wherein the flexible substrate is a chip on film.

16. The device of claim 15, wherein the chip on film is a tape carrier package.

17. The device of claim 11, further comprising:
    a display panel in the mold frame;
    a backlight unit in the mold frame, the backlight unit configured to provide light to the display panel;
    a light guide plate below the display panel, the light guide configured to input light from the backlight unit to the display panel;
    an optical sheet between the light guide plate and the panel;
    a reflection plate in the mold frame below the light guide plate;
    a bottom chassis below the reflection plate, the bottom chassis supporting the mold frame, and the bottom chassis combining with the housing chassis to form the display device; and
    a printed circuit board below the bottom chassis, the printed circuit board including circuit elements configured to send a control signal to the integrated circuit.

18. The device of claim 11, wherein the at least one magnet includes two magnets located on opposite sides of the integrated circuit.

* * * * *